United States Patent
Schwirian et al.

[11] Patent Number: 5,553,107
[45] Date of Patent: Sep. 3, 1996

[54] PRESSURIZED WATER REACTOR VESSEL WITH SLOTTED SUPPORT COLUMNS

[75] Inventors: Richard E. Schwirian, Pleasant Hills; Theo van de Venne, Murrysville, both of Pa.

[73] Assignee: Westinghouse Electric Corporation, Pittsburgh, Pa.

[21] Appl. No.: 380,785

[22] Filed: Jan. 30, 1995

[51] Int. Cl.$^6$ ..................................................... G21C 1/04
[52] U.S. Cl. ........................... 376/352; 376/438; 376/439; 376/448
[58] Field of Search ..................... 376/352, 438, 376/449, 448; 976/DIG. 168

[56] References Cited

U.S. PATENT DOCUMENTS

| | | | |
|---|---|---|---|
| 4,016,035 | 4/1977 | Gallet et al. | 376/362 |
| 4,173,513 | 11/1979 | Obermeyer et al. | 376/353 |
| 4,752,438 | 6/1988 | Desfontaines et al. | 376/285 |
| 4,822,557 | 4/1989 | Suzuki et al. | 376/282 |
| 5,024,808 | 6/1991 | Land et al. | 376/353 |

*Primary Examiner*—Charles T. Jordan
*Assistant Examiner*—Meena Chelliah

[57] ABSTRACT

A pressurized water nuclear reactor pressure vessel has an upper core support plate with passageways for the passage of coolant, an upper support plate above the upper core support plate, and peripheral hollow support columns extending upwardly above the passageways in the upper core support plate for supporting the upper support plate above the upper core support plate and for guiding coolant from the passageways into the plenum. Each peripheral support column has a peripherally slotted upper portion for guiding the coolant in the peripheral support column into the plenum and an unslotted lower portion.

5 Claims, 3 Drawing Sheets

PRESSURIZED WATER REACTOR VESSEL WITH SLOTTED SUPPORT COLUMNS

BACKGROUND OF THE INVENTION

The invention relates to a pressurized water nuclear reactor vessel having support columns supporting an upper support plate above an upper core support plate in its upper plenum and, more particularly, to a pressure vessel having slotted support columns for guiding reactor coolant flowing from the upper core support plate into the upper plenum.

In the power operation of a pressurized water nuclear reactor facility, reactor coolant absorbs heat from fission reactions of pelletized fuel contained within thousands of one inch or smaller diameter fuel rods arranged in about 120 to about 190 fuel assemblies supported in the core of a reactor vessel by a lower core support plate and an upper core support plate. Hot coolant streams then flow from the core region upwardly through various passageways in the upper core support plate into an upper plenum where the several coolant streams mix together and then flow from the upper plenum through a hot leg to a steam generator.

In commercial facilities, fuel assemblies having different enrichments are loaded into the core in patterns which provide a uniform power distribution throughout the core. In low leakage fuel assembly loading patterns, the most highly enriched fuel assemblies are generally located between peripherally located lower enrichment fuel assemblies (which advantageously reduces the neutron fluence and improves the core efficiency) and the lowest enriched fuel assemblies in the central core region. However, calculations have shown that the temperatures of the coolant streams flowing through the passageways above the various regions of a core having a low leakage pattern may vary up to about thirty to fifty degrees Fahrenheit or more. The inventors have determined that these coolant streams may not sufficiently thermally mix together in the upper plenum above the upper core support plate and that this thermal condition may cause hot leg streaming of the coolant flowing through the hot leg with significant temperature deviations from the bulk coolant temperature. Hot leg streaming may result in inaccurate readings by hot leg resistance temperature detectors and uncertain heat balances around the reactor.

SUMMARY OF THE INVENTION

Thus, it is an object of the present invention to thermally mix the streams of hot coolant in the upper plenum before the coolant flows into the hot leg. It is a further object of the present invention to mitigate hot leg streaming.

With these objects in view, the present invention resides in a pressurized water nuclear reactor pressure vessel having an upper plenum defined by core support plate and an upper support plate. Support columns extend upwardly through the plenum for supporting the upper support plate above the upper core support plate. The core support plate has passageways for the passage of coolant into the upper plenum and peripheral hollow support columns extending upwardly above the peripheral passageways. These columns have unslotted lower sections and peripherally slotted upper portions for guiding the coolant flowing from the underlying passageways into the upper regions of the plenum. Advantageously, relatively cold coolant streams flowing from the peripheral columns will substantially mix with the bulk of the coolant in the plenum before flowing into the hot leg.

BRIEF DESCRIPTION OF THE DRAWINGS

The invention as set forth in the claims will become more apparent from the following detailed description of a preferred embodiment thereof shown, by way of example only, in the accompanying drawings, wherein:

DESCRIPTION OF THE PREFERRED EMBODIMENT

Figure 1:
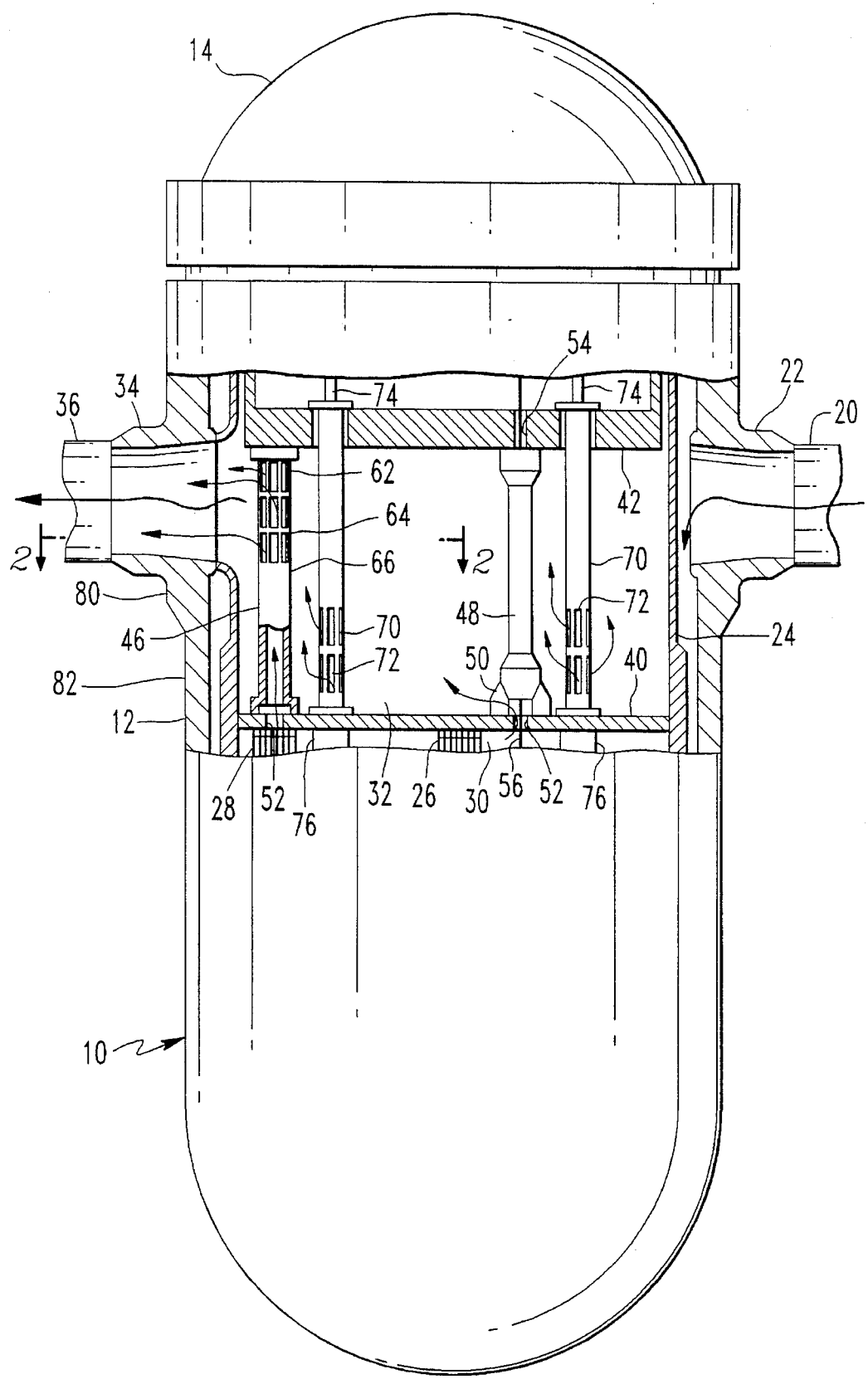
FIG. 1 is a vertical view of a reactor vessel partially sectioned to show its upper plenum region.

Referring now to the drawings in detail and in particular to FIG. 1 there is shown a nuclear reactor vessel 10 having a generally cylindrical vessel body 12 and a removable head 14 for heating coolant recirculating between the reactor vessel 10 and one or more steam generators (not shown). Commercial nuclear reactors normally are coupled with two to four steam generators. The coolant, which generally is deionized water containing parts per million quantities of boron and lithium, flows from a steam generator (not shown) through a large cold leg pipe 20 and into a cold leg nozzle 22 of the reactor vessel 10. The coolant flows downwardly through the annular space defined by the vessel body 12 and a generally concentric core barrel 24. The coolant then flows upwardly past the fuel assemblies, including interior assemblies (shown as one assembly 26) and peripheral assemblies (shown as one assembly 28) in the core 30, into the upper plenum 32, out of the reactor vessel 10 through a hot leg nozzle 34 into a hot leg pipe 36 and back to the steam generator. As employed herein, "peripheral" assemblies refer to those assemblies near the core barrel 24 and "interior" assemblies refer to the other assemblies in the interior of the array.

The upper plenum 32 is generally defined by an upper core support plate 40 and an upper support plate 42 within the core barrel 24. Both support plates 40 and 42 are supported on the core barrel 24, which in turn is supported on the vessel body 12. The upper support plate 42 is further supported by peripheral support columns (shown as peripheral support column 46) and interior support columns (shown as interior support column 48) extending from the upper core support plate 40. As employed herein, "peripheral" support columns refer to those columns adjacent the core barrel 24 and "interior" columns refer to the other columns in the interior of the array.

The interior support column 48 shown in FIG. 1 generally illustrates a well known column design having a cylindrical vertically extending length with downwardly extending support legs 50. The interior support columns normally are aligned with passageways 52 in the upper core support plate 40 and passageways 54 in the upper support plate 42 which permit incore instrumentation 56 to extend from the head 14 into the core 30. Peripheral support columns having a similar design generally have vertical rods rather than cylinders because they are not employed to protect the instrumentation 56. The passageways 52 may have diameters of up to about six inches or more. This type of design also permits some of the coolant to flow through the passageways 52 and into the lower region of the upper plenum 32. Another known support column design has a vertically oriented cylinder with flanges which contact the support plates 40 and 42 in the manner that the peripheral support column 46 shown in FIG. 1 contact the support plates 40 and 42. However, unlike the support column 46 of FIG. 1 (which has a series of peripheral slots 62 in its upper section 64 and an unslotted lower section 66), the earlier design provided a series of peripheral slots along the entire length of the cylinder which introduced coolant into the lower region as well as the upper region of the upper plenum.

As is shown in FIG. 1, the upper plenum 32 also contains guide tubes 70 having bottom slots 72 extending therethrough. These tubes 70 permit control rod drives 74 to position the rod control clusters 76 in the core 30. The slots 72 are sized so that most of the coolant in the core region 30 flows into the upper plenum 32 through the bottom slots 72. The upper portion of the guide tubes 70 are unslotted so that streams of coolant flow into the lower region of the upper plenum 32 below the level of the hot leg nozzle 34 and mix together in the interior of the array as they flow toward the hot leg nozzle 34.

Figure 2:
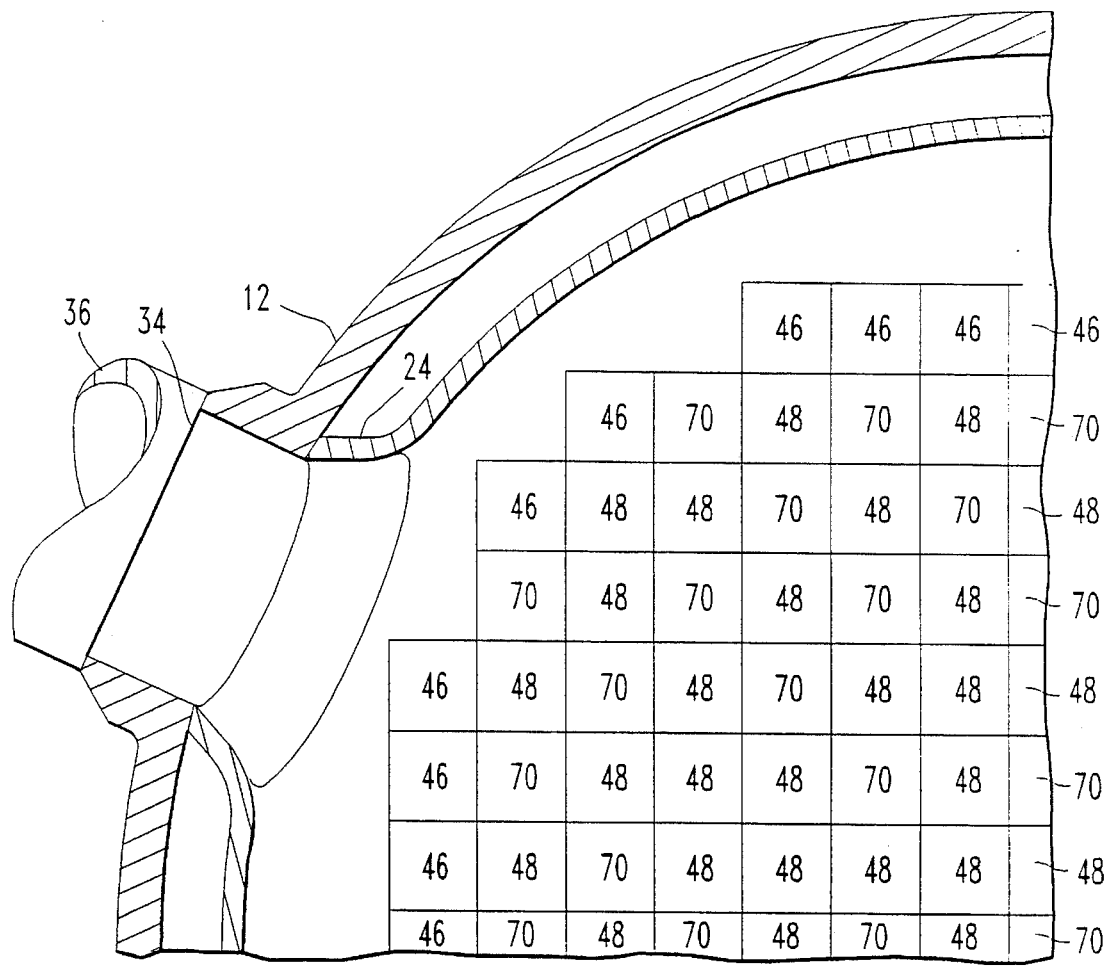
FIG. 2 is a plan view of the reactor vessel generally showing the relative locations of support columns and guide tubes in a quadrant of the upper plenum as taken along Section Line 2—2 of FIG. 1.
Figure 3:
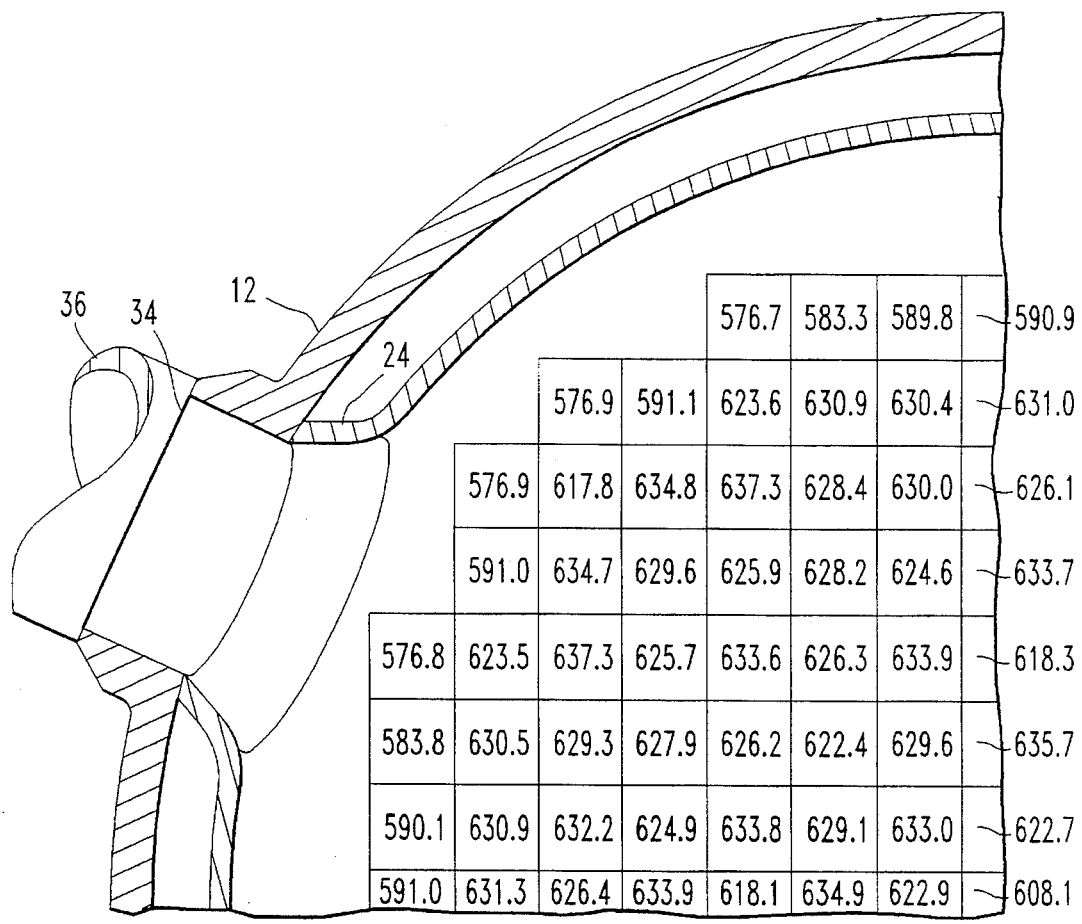
FIG. 3 is a plan view of the reactor vessel showing calculated temperatures (in degrees Fahrenheit) of coolant flowing upwardly from the core of the reactor vessel at the same radial locations shown in FIG. 2.

FIG. 2 generally shows the relative locations of the peripheral support columns 46, the interior support columns 48 and the guide tubes 70 (shown in FIG. 1) in one quadrant of the upper plenum 32. The relative locations of columns 46 and 48 and tubes 70 will be the same in the other quadrants. FIG. 3 generally shows the calculated temperature of streams of coolant flowing from a core region 30 in which the fuel assemblies have been loaded in a low leakage pattern with the lowest enriched fuel in the central portion of the core and the highest enriched fuel in the surrounding portion of the core with low enriched peripheral fuel assemblies 28 (shown in FIG. 1) adjacent the core shroud 24. As may be seen in FIG. 3, the coolant temperature at the peripheral locations will vary from about 577 to about 591 degrees Fahrenheit and the highest coolant temperatures in the interior will vary from about 608 to about 635 degrees Fahrenheit.

The inventors of the present invention have hypothesized that hot leg streaming from reactor vessels having low leakage loading patterns can occur due to the flow of relatively cool coolant through the lower portions of peripheral support columns toward the lower portion of the hot leg nozzles 34 without sufficiently mixing with the bulk of the coolant flowing from the interior region of the upper plenum. Thus, they introduce relatively cold coolant flowing from passageways in the upper core support plate 40 above the peripheral fuel rods 28 into the upper regions of the upper plenum 32 so that the relatively cold coolant can mix with the hotter coolant from the interior portions of the upper plenum 32. Accordingly, reactor vessels 12 of the present invention have peripheral hollow support columns with slots 62 in their upper portions 64 and unslotted lower portions 66. Preferably, the slots 62 comprise at least about 50% of the peripheral area of the upper section 64, and most preferably from abut 50% to about 66% of the peripheral area of the upper section 64, to provide a large flow area for introducing the relatively cold coolant into the bulk of the coolant at the lowest practical velocity. As used above and hereafter in the following claims of invention, the "upper portion" of a peripheral support column refers to the upper half of a support column and the "lower portion" of a support column refers to the lower half of a support column. Preferably, however, the slots 62 of the peripheral support columns 46 do not extend below the bottom of the hot leg nozzle 34. As is shown in FIG. 1, the slots 62 of the peripheral support columns 46 are preferably above the slots 72 of the guide tubes 70.

The inventors conducted several analytical hot leg steaming studies using computational fluid dynamics to test their hypothesis using the core exit temperatures of FIG. 3 as input to a standard four loop upper plenum. A top slotted peripheral support column design embodying the present invention was compared with a standard unslotted peripheral support column design and a full slotted peripheral support column design. For each case, the mixing effectiveness was measured in terms of the range of coolant temperatures in the hot leg cross-section at the resistance temperature detectors (Temp. Range) and the standard deviation of the coolant temperatures in the hot leg cross-section at the resistance temperature detectors (Temp. Dev.). The mixing effectiveness of each design increases as each parameter decreases. The comparison is shown in the following table:

| PERIPHERAL COLUMN DESIGN | TEMP. RANGE (°F.) | TEMP. DEV. (°F.) |
| --- | --- | --- |
| No Slots Along Length | 5.41 | 1.41 |
| Slots Along Entire Length | 5.97 | 1.41 |
| Slots Only In Upper Portion | 3.61 | 0.96 |

As this table shows, the column design of the present invention (wherein only the upper portion of the peripheral columns are slotted) enhances thermal mixing by about 30–40% in the hot leg.

While a present preferred embodiment of the present invention has been shown and described, it is to be understood that the invention may be otherwise variously embodied within the scope of the following claims of invention.

We claim:

1. A pressurized water nuclear reactor pressure vessel, comprising:

an upper core support plate having passageways for the passage of coolant;

an upper support plate above the upper core support plate, the upper support plate and the upper core support plate defining a plenum; and peripheral hollow support columns extending upwardly through the plenum above the passageways in the upper core support plate with each of the peripheral hollow support columns being aligned with a passageway for supporting the upper support plate above the upper core support plate and for guiding coolant from the passageways into the plenum, each peripheral support column having an unslotted axial lower portion for guiding the coolant flowing through the aligned passageway upwardly through the peripheral support column and having a peripherally slotted upper axial portion for guiding the coolant in the peripheral support column into the plenum.

2. The pressurized water nuclear reactor vessel of claim 1 wherein the vessel has a hot leg nozzle and the peripheral support columns are unslotted below the hot leg nozzle.

3. The pressurized water nuclear reactor vessel of claim 1 wherein the slots in each peripheral support column comprises at least 50% of the peripheral surface area of the upper portion of the support column.

4. The pressurized water nuclear reactor vessel of claim 3 wherein the slots in each peripheral support column comprises from 50% to 66% of the peripheral surface area of the upper portion of the support column.

5. The pressurized water nuclear reactor vessel of claim 1 wherein guide tubes extend from the upper core support plate to the upper support plate, the guide tubes having peripheral slots for guiding coolant into the plenum, and wherein the slotted portion of each peripheral support column is above the slots of the guide tubes.

* * * * *